Sept. 25, 1951          J. A. CIAIO          2,568,884
SHOE CONSTRUCTION AND METHOD OF MAKING SAME
Filed Feb. 16, 1949
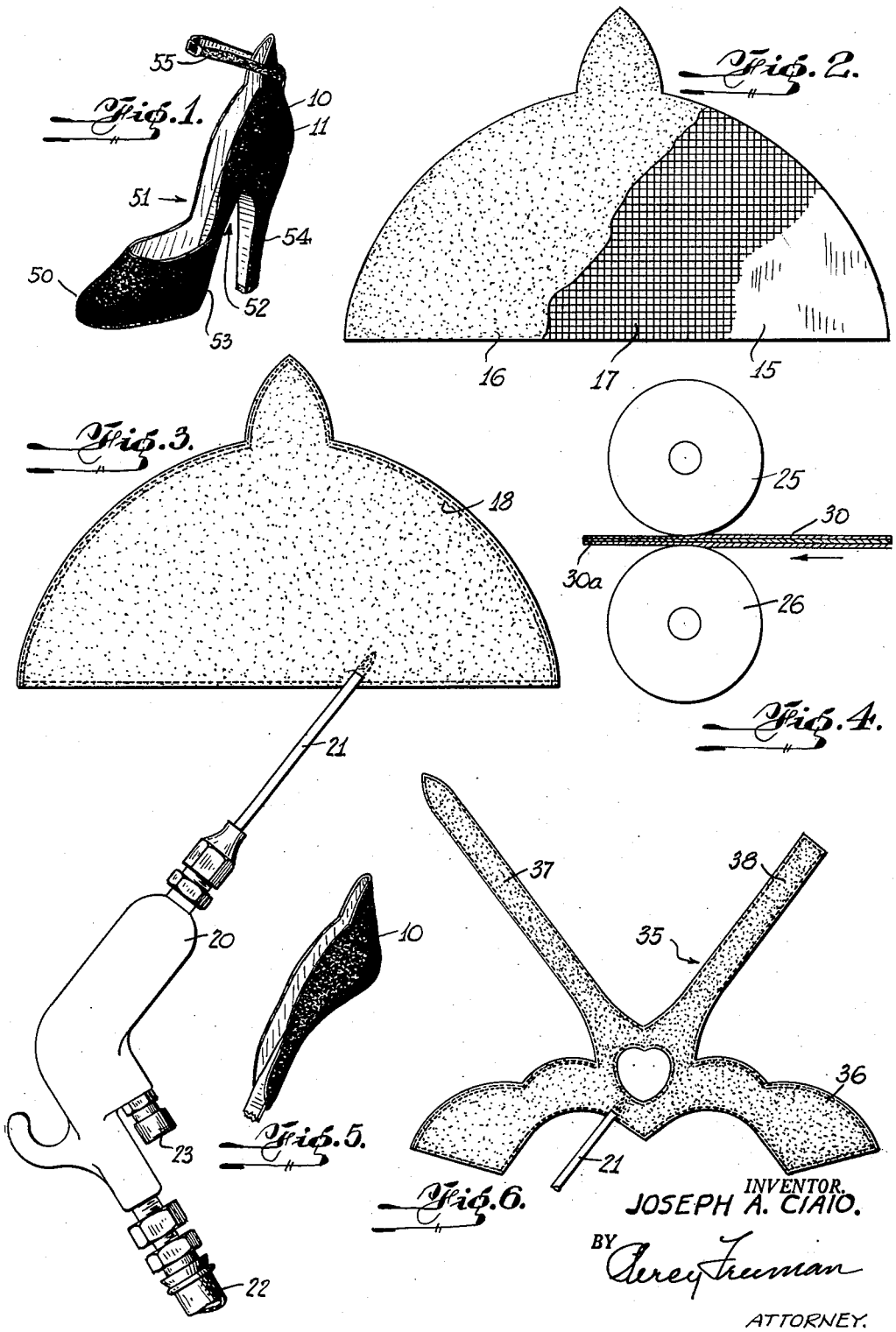
INVENTOR.
JOSEPH A. CIAIO.
BY
ATTORNEY.

Patented Sept. 25, 1951

2,568,884

UNITED STATES PATENT OFFICE 2,568,884

SHOE CONSTRUCTION AND METHOD OF MAKING SAME

Joseph A. Ciaio, Corona, N. Y., assignor to Snap-It, Snug-Fit Shoe Machinery Co., Inc., a corporation of Delaware Application February 16, 1949, Serial No. 76,795

4 Claims. (Cl. 154—127)

This invention relates to a process of interposing a plastic layer between the outer covering and the lining of a shoe and it also relates to the product of said process.

Plastics have heretofore been used in shoe manufacture. In some cases, the plastic material has been molded to the shoe as an integral part thereof. In other cases, the plastic material has been fabricated into various parts of the shoe as for example the upper. The fabrication processes made use of sheet plastics cut to appropriate size and shape, and incorporated into the shoe by conventional methods, as by sewing. In still other cases, the plastic material has been prefabricated to a predetermined shape and dimensions and thereafter placed in the shoe.

The present process utilizes plastic materials in solution form and these materials are injected, for instance, into the space between the upper and the lining, or between the layers of other like parts of the shoe, for example, the quarter, the box toe, ankle straps, inside vamp line, outside vamp line, etc. Other uses of this process are for stuffing bows, thus imparting to lighter weight materials, as light and medium weight leathers, the resistance of heavier weight leathers. Although this is an injection method of working the plastic material, there is no need for a mold, since the space into which the material is injected is a confined space and leakage is thereby avoided. The plastic material thus injected between the two layers of the shoe is itself caused to assume the flat shape of a layer by simply passing the two shoe layers between a pair of rollers or a calender. In this manner, the plastic material is evenly dispersed throughout the space between the two shoe layers, and it is thereby pressed or rolled into layer-like proportions.

In brief and general terms, the process contemplates the use of a hypodermic needle attached to a manually controlled air gun connected to a source of air pressure and a reservoir for a cellulose nitrate or other suitable solution. The needle is inserted between the upper and lining stock of any part of a shoe and by releasing air pressure from the hand gun to the reservoir, the compressed air extrudes the plastics solution to flow between the lining and the upper. The part is then calendered and the shoe is then lasted and goes through the process of taking on the shape of the contours of the last.

The use of the present process has been found highly beneficial in conjunction with California Process shoes.

The injection of plastic into the parts of the vamp or quarter is performed just before the shoe is slip lasted. With a closed toe on a California Process or Compo shoe, the plastic solution extruded into the toe part fuses the lining, the plastic foraminous material and the upper stock and imparts to such a toe structure sufficient strength and resiliency to maintain the toe contour and assure shoe comfort throughout the life of the shoe.

When a box toe was made by my process, it was found to have uniformity of surface smoothness, of thickness and of stiffness; its water and sweat resistance was good; its elasticity, good; it had good resistance to distortion of the stock; it blended well into the lines of the finished shoe.

In making what I term a snap back counter of a shoe, the component parts of the foraminous plastic sheet may be cut by a clicker die to the shape and size of any counter pocket. This die-cut sheet or screen is then placed in the counter pocket, and the pocket is then sewed closed whereupon it is ready for the plastic extrusion. After the plastic solution has been injected and the shoe part calendered, the first drafting of the quarter is performed. When the pullover and the operation of automatic heel seat lasting has been completed, it is left to dry for approximately 24 hours.

It is said that reinforcements on stays are to a shoe what steel girders are to a concrete building structure. To give satisfactory wear and retain its fitting qualities, the shoe must be reinforced at points of strain and stress. By the use of my process of plastic extrusion between the lining and the upper, a more uniform and greater smoothness of the upper on the last is obtained. When the ankle strap quarter is processed in accordance with this invention, the process imparts of the ankle strap the comformable contours of the quarter on the last which in turn conforms with the natural contour of the ankle which prevents gapping.

The process herein described and claimed involves the use of plastics material in still another form. Foraminous plastic material such as plastic screening is placed between the two shoe part layers before the plastic solution is injected therein. The plastic screening is permanently attached to the layers of the shoe by the same means which attaches said layers to each other. For example, the upper and the lining are normally fastened to each other by sewing their respective edges together. The plastic screening which has the same shape as the upper and the lining is affixed to said upper and lining by the same stitching which fastens said upper and said lining together. Hence all three layers, to wit, the upper, the screening and the lining are fastened to each other along their respective peripheral edges, but they are free from each other in all other respects. When the plastic solution is injected into the space between the upper and the lining, it tends to fill the interstices in the plastic screening, and it also tends to flow into the spaces on both sides of said screen. When the material is rolled or pressed between a pair of calender rolls, dispersion of the plastic material becomes uniform throughout and in consequence, there is an intimate intermingling between said solution and said screen. A unitary plastic layer is thereby formed and by the same token said plastic layer is caused to adhere very securely to the upper and the lining. When the solution sets, a three-ply shoe part results, which is flexible and still self-sustaining.

The three-ply layer which the present process produces makes for a freely flexible conformable shoe with high resistive powers. The resistance of the leather to wear and to permanent distortion is thereby built up to extremely high levels but the leather loses none of its flexibility. What has been said of leather is equally true of the other materials which are conventionally used in shoe construction, such as the many fabrics and leather substitutes which go into the making of women's shoes.

The three-ply shoe material produced by means of the process herein described and claimed has additional advantages and beneficial properties. For example, it has been found that this construction is highly resistant to water and to perspiration. It may, therefore, be used to great advantage in the construction of so-called water-proof shoes. Another advantage resides in the combined strength of all three plies which exceeds by far the strength of the two outer plies alone. Not only is their combined strength very considerable but the strength of each of the two outer layers is also enhanced by the reinforcing nature of the inner plastic ply. The plastic solution not only passes into the interstices of the screen but it also enters pores of the two outer layers and in that way, it very measurably enhances their strength.

Other advantages which are inherent in the three-ply construction include the uniform character of said construction. It is uniform in surface, both outer and inner, and it is also uniform in smoothness, thickness and stiffness. Insofar as the latter property is concerned, namely stiffness, this property is valuable when the material is to be used in box-toe construction. The material may be rendered as stiff or as flexible as desired, by simply changing the properties of the plastic solution which is to be used. Thus a shoe construction which incorporates a given type of leather for the upper may be rendered more or less stiff, as desired, by simply controlling the properties of the plastic solution. Another element or factor to be considered in this connection is the type of plastic screening which is to be used. A stiffer material will, of course, produce a stiffer ply construction and a relatively flexible material will be productive of a relatively flexible ply construction.

Still another advantage of the three-ply construction of the present invention is its extensibility. It constitutes a good working material for the shoe maker. It can be pulled or urged to proper shape during the course of the shoe making operations. It is well adapted to flow smoothly into the lines of the shoe to provide a strikingly beautiful appearance. Once, however, it is incorporated into the shoe, it very strongly resists permanent distortion such as normally results from the twisting and flexing of normal wear.

It is accordingly the principal object of this invention to provide a process of making a three-ply shoe construction such as has above been described, with all of its inherent and appurtenant advantages herein set forth.

Another important object of this invention is the provision of the three-ply construction hereinabove described. The details of said construction will follow.

Preferred forms of the three-ply shoe construction herein claimed and the steps in the process herein claimed are illustrated in the accompanying drawing, in which:

Fig. 1 is a perspective view of a lady's shoe made in accordance with the present invention.

Fig. 2 is a plan view, partly broken away, of the three-ply construction herein described and claimed, parts of said three-plies being exposed to view.

Fig. 3 is a plan view of the same three-ply construction, showing all of the edges thereof sewed together, and showing a plastic solution injecting gun with its needle-shaped nozzle piercing one of the outer layers of said three-ply construction, preparatory to injecting an appropriate quantity of said plastic solution.

Fig. 4 is a diagrammatic view, partly in section, showing the three-ply construction passing between a pair of rollers following the injection of the plastic solution therein.

Fig. 5 is a perspective view of the closed quarter of a shoe made in accordance with the present invention, such as the shoe shown in Fig. 1 hereof.

Fig. 6 is a plan view of another three-ply construction made in accordance with the present invention, the needle-shaped nozzle of the gun being shown in operative position relative to one of the outer layers of said three-ply construction, said three-ply construction including an open back quarter and a pair of ankle straps.

Figs. 2 and 3 show a typical three-ply construction made in accordance with the present invention. This construction is of a closed quarter such as closed quarter 10 shown in Fig. 5, for a shoe 11 such as is shown in Fig. 1, which shoe includes also box toe 50, inside arch 51, outside shank 52, vamp 53, heel 54, and ankle strap 55. This three-ply construction comprises a pair of outer layers 15 and 16, respectively, and an inner layer 17 which is sandwiched in between said outer layers. One of the outer layers may comprise the outer material of which the closed quarter is made, such as leather, fabric or the like. The other outer layer may constitute the lining of said closed quarter, and it may be made of any conventional lining material, such as leather or fabric or any other similar material. The inner layer 17 is the foraminous material or screening above mentioned. Preferably this screening is made of plastic material whether thermoplastic or thermosetting. An illustration is Lumite screen cloth of the Chicopee Manufacturing Company, which is woven of vinylidene chloride monofilament 0.015 in. in diameter in 18 and 20 mesh. The Dow Chemical Company also puts out a vinylidene chloride plastic screen under the trade-mark Saran. Velon of the Firestone Tire and Rubber Company, nylon of E. I. du Pont De Nemours and Company, Inc. and Lumarith of the Celanese Plastics Corporation are also suitable for the purposes of this invention.

The three layers or plies are sewed together along their respective peripheral edges by means of stitching 18, or they may be fastened together along their said edges by any other conventional means, such as cement or in any other suitable way, depending upon the nature of the materials of which said plies are made. It will be evident, therefore, that the three plies are fastened to each other, thus far, only along their respective peripheral edges. In all other respects, they are free from each other.

The three-ply construction herein claimed is now ready for the next step in its processing. In this step, a plastic solution is shot or injected into the space between the two outer plies, as well as into the interstices of the screening which constitutes the inner or middle ply. This operation is conducted by means of a compressed air gun 20 having a needle-like nozzle 21 which is sufficiently sharp to pierce either of the outer plies of the construction without doing permanent harm or injury thereto. Said compressed air is forced into a tank (not shown) containing a supply of plastic material. The pressure forces the plastic through the hose 22 into the gun 20 up to by-pass valve 23 which gives the operator the control of flow of the plastic. The needle or nozzle of the gun is caused to pierce one of the outer layers of the three-ply construction and a suitable quantity of the plastic solution is shot into the space between said outer layers, under the influence of the compressed air. Following this operation the three-ply construction is rolled or pressed between rollers 25 and 26, respectively, of a calendering machine. Its condition prior to calendering is shown on the right side of the rollers as viewed in Fig. 4, and as indicated by means of the reference character 30. The condition of the material following the calendering operation is shown on the left side of the rollers and identified by means of the reference character 30a. Calendering the material has the effect of uniformly distributing the plastic solution. The solution is caused to enter all of the openings of the screen cloth and also the pores of the two outer plies. All three plies are pressed together as Fig. 4 clearly shows and the plastic solution is thereby enabled, when it sets, to provide a cementitious bond holding the three plies tightly and securely together.

The plastic solution used in the foregoing operation may be of any suitable type. Cellulose nitrate has been found to be a desirable material in this connection. Cellulose nitrate in powder and other forms may be purchased under various trade-marks.

In Fig. 6, a three-ply construction 35 is shown, which includes an open back quarter 36 and a pair of angle straps 37 and 38 respectively. Here too a three-ply construction is shown wherein all of the peripheral as well as inner edges of the three-plies are sewed together. The nozzle 21 of a compressed air gun is shown in operative position relative to said three-ply construction in precisely the same manner as it is shown in Fig. 3. Following the injection of the plastic solution into said three-ply construction, the pressing or calendering operation takes place as above described.

A modified method of carrying out the process may include the step of blanking out the foraminous plastic sheet with a clicker die to the shape or form of any counter pocket, after which the foraminous material may be coated or spread with a cellulose nitrate solution, or it may be dipped, and in either case allowed to dry, after which the coated material may be softened, when required for insertion in a counter pocket, by the use of a solvent such as acetone, just prior to the first drafting or the pull over on a last. Softening of the foraminous material may also be accomplished by heat in the dry form, or by the vapors of a solvent, or by dipping the material into sufficiently hot water.

It will be noticed that with the use of this process, a one-piece quarter may be efficiently made, as seen in Figs. 2 and 3 of the drawing, thus eliminating the labor as well as the unsightliness of a seam in the back of the shoe and the seaming of the lining, so that its smooth unbroken surface may be presented to the foot of the wearer.

My process also facilitates the making of a one-piece square back quarter, as well as what is known in the trade as square box toes.

The foregoing is descriptive of preferred forms of the present invention, and it will be appreciated that the invention may take other forms equally as well.

Having thus described my invention, what I claim as new and desire to secure by Letters Patent, is:

1. The shoe making process of the character described comprising the steps of fastening a pair of outer layers of shoe material to an inner layer of foraminous material along all their respective edges, thus forming a multi-ply construction having a closed pocket between the layers, then injecting a plastic solution into said pocket and then pressing said construction uniformly to provide a uniform distribution of said injected plastic solution and to cause said plastic solution to enter all of the openings of said foraminous material and the pores of said outer layers.

2. The shoe making process of the character described comprising the steps of fastening a pair of outer layers of shoe material together along all their respective edges, after inserting between said layers within the lines of attachment an inner layer of foraminous material, to provide a multi-ply construction, the plies of which are unattached except at their edges, then injecting a plastic solution into said multi-ply construction and then pressing said construction uniformly to provide a uniform distribution of said injected plastic solution and to cause said plastic solution to enter all of the openings of said foraminous material and the pores of said outer layers.

3. The shoe making process of the character described comprising fastening a plurality of layers of shoe making material together along all their respective edges, to provide a multi-ply construction, the plies of which are unattached except at their edges, at least one of the inner of said layers comprising vinylidene chloride screen, then injecting a cellulose nitrate solution into the space between said outer layers and into the holes of said screen and finally rolling said multi-ply construction between a pair of rollers to evenly distribute said cellulose nitrate solution and to cause it to enter the pores of the two outer layers, thereby enabling said solution, when it sets, to serve as a cementitious bond between the inner and outer layers.

4. In the process of making shoe parts, the steps of attaching together two layers of shoe making material along all their respective edges, after inserting between said layers within the lines of attachment an inner layer of vinylidene chloride screen to provide an enclosed pocketed area, then injecting a cellulose nitrate solution into said pocketed area and into the holes of said screen and finally rolling said three-ply construction between a pair of rollers to evenly distribute said cellulose nitrate solution and to cause it to enter the pores of the two outer layers, thereby enabling said solution, when it sets, to serve as a cementitious bond between the inner and outer layers.

JOSEPH A. CIAIO.

REFERENCES CITED

The following references are of record in the file of this patent:

UNITED STATES PATENTS

| Number | Name | Date |
| --- | --- | --- |
| 2,140,614 | Bancroft | Dec. 20, 1938 |
| 2,424,777 | Stuart | July 29, 1947 |